United States Patent [19]

Cohen et al.

[11] Patent Number: 5,780,538
[45] Date of Patent: Jul. 14, 1998

[54] SILICA REINFORCED RUBBER COMPOSITION AND TIRE WITH TREAD

[75] Inventors: Martin Paul Cohen, Fairlawn; Raymond Benjamin Roennau, Stow; Cheryl Ann Losey, Kent, all of Ohio

[73] Assignee: The GoodYear Tire & Rubber Company, Akron, Ohio

[21] Appl. No.: 613,654

[22] Filed: Mar. 11, 1996

[51] Int. Cl.$^6$ .................. C08K 3/36; C08K 5/54

[52] U.S. Cl. .......... 524/494; 524/493; 524/495; 524/496; 524/261; 524/265; 524/267; 524/332; 152/209 R

[58] Field of Search .................. 524/496, 493, 524/495, 261, 262, 265, 267, 332; 152/209 R

[56] References Cited

U.S. PATENT DOCUMENTS

| | | | |
|---|---|---|---|
| 3,768,537 | 10/1973 | Hess et al. | 260/765 |
| 3,938,574 | 2/1976 | Burmester et al. | 524/262 |
| 4,201,698 | 5/1980 | Itoh et al. | 260/3 |
| 4,229,333 | 10/1980 | Wolff et al. | 260/23.7 |
| 5,580,919 | 12/1996 | Agostini et al. | 524/493 |

*Primary Examiner*—Vasu Jagannathan
*Assistant Examiner*—Olga Asinovsky
*Attorney, Agent, or Firm*—Henry C. Young, Jr.

[57] ABSTRACT

The present invention relates to a silica reinforced rubber composition and to pneumatic tires having treads comprised of the silica reinforced rubber compositions.

The silica reinforced rubber composition comprises at least one elastomer, silica, a silica coupler, a hydrophobating agent and, optionally, carbon black.

8 Claims, No Drawings

SILICA REINFORCED RUBBER COMPOSITION AND TIRE WITH TREAD

FIELD

This invention relates to rubber compositions which are quantitatively reinforced with silica. In one aspect, the rubber composition is comprised of rubber, particularly sulfur curable, or cured, rubber, reinforced with a combination of silica, silica coupling agent, hydrophobating agent and, optionally, carbon black.

BACKGROUND

For various applications utilizing rubber which require high strength and abrasion resistance, particularly applications such as tires and various industrial products, sulfur cured rubber is utilized which contains substantial amounts of reinforcing fillers. Carbon black is commonly used for such purpose and normally provides or enhances good physical properties for the sulfur cured rubber. Particulate silica is also often used for such purpose, particularly when the silica is used in conjunction with a coupling agent. In some cases, a combination of silica and carbon black is utilized for reinforcing fillers for various rubber products, including treads for tires. The use of such reinforcing fillers for elastomers, including sulfur curable elastomers, is well known to those having skill in such art.

It is important to appreciate that, conventionally, carbon black is a considerably more effective reinforcing filler for rubber products, and particularly for rubber tire treads than silica if the silica is used without a coupling agent, or silica coupler as it may be sometimes referred to herein.

Often coupling agents are composed of a silane which has at least one first constituent component, or moiety, (such as a silane portion) capable of reacting with the silica surface and, also, an additional moiety capable of interacting with the rubber, particularly a sulfur vulcanizable rubber which contains carbon-to-carbon double bonds, or unsaturation. Usually the additional moiety is sulfur in a form of a polysulfide and particularly a polysulfide bridge between said first moieties. In this manner, then the coupler acts as a connecting bridge between the silica and the rubber and thereby enhances the rubber reinforcement aspect of the silica.

The rubber-reactive group component, namely the said additional moiety, of such coupler may be, for example, one or more of groups such as mercapto, amino, vinyl, epoxy, and sulfur groups, preferably a sulfur or mercapto moiety and more preferably sulfur in a form of a polysulfide as a polysulfide bridge between at least two of said first moieties.

Numerous of such coupling agents are taught for use in combining silica and rubber such as, for example, silane coupling agents containing a polysulfide component, or structure such as, for example, trialkoxyorganosilane polysulfides such as, for example, bis-(3-trialkoxysilylorgano) polysulfides, containing from about 2 to about 8 sulfur atoms in a polysulfide bridge such as, for example, bis-(3-triethoxysilylpropyl)tetrasulfide and/or trisulfide.

Various U.S. patents relating to silicas and silica reinforced tire treads include, for example, U.S. Pat. Nos. 3,451,458; 3,664,403; 3,768,537; 3,884,285; 3,938,574; 4,482,663; 4,590,052 and 5,089,554.

In one aspect, and in contrast to the aforesaid rubber reactive silica coupling agents, other silica-reactive materials might be utilized to interact with the silica which have only one constituent component, or moiety, and which is capable of reacting with the silica surface. Such materials are not readily reactive with the rubber so that they do not readily promote interaction between the silica and the rubber. Therefore, by itself, such material is not considered herein to enable the silica to satisfactorily reinforce the rubber.

The term "phr" if used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a rubber composition is provided which comprises (A) 100 parts by weight of at least one diene-based elastomer, (B) about 30 to about 100, optionally about 45 to about 90, phr particulate reinforcing filler composed of precipitated silica and carbon black, comprised of about 30 to about 100, alternatively about 35 to about 85, phr of precipitated silica and correspondingly about zero to about 50, alternatively about 5 to about 40, phr of carbon black, wherein the weight ratio of silica to carbon black is at least about 1/1 and alternatively at least about 2/1 and alternatively at least 10/1, (C) at least one silica coupler having a moiety reactive with said silica and a moiety interactive with said elastomer(s), (D) about 0.5 to about 10, alternatively about 0.5 to about 5 phr of a silica-reactive, silane-containing hydrophobating agent.

It is an important feature of this invention that a relatively highly silica loaded elastomer composition is provided which contains the silica-reactive, alkylalkoxysilane hydrophobating agent together with the silica coupler.

The term "hydrophobic" conventionally relates to "materials which are antagonistic to water" and, thus, incapable of dissolving in water. The term "hydrophilic" conventionally relates to "materials which have a strong tendency to bind or absorb water". Water is normally considered to be a polar substance, as is silica, whereas rubber is normally considered to be non-polar in nature.

The term "hydrophobating" is used herein to mean "rendering less polar, and less hydrophilic, through chemical conversion of the polar, hydrophilic functional groups to more non-polar, hydrophobic composition".

By the term "silica-reactive hydrophobating agent" it is meant herein that "the alkoxysilane units of the agent react with silanol groups at the silica surface" and, thus, chemically combine with the silica as also does the silane component of the silica coupler. An alkyl hydrocarbon functionalized hydrophobic silyl group is, thus, placed on the silica surface in place of the silanol group. While it is recognized that both the silica coupler (the silane moiety of the coupler) and the hydrophobating agent compete for the silanol groups on the silica surface, only the silica coupler, namely the aforesaid additional moiety such as, for example, a polysulfide bridge, has reactivity with the elastomer.

Because both the silane moiety of a silane-containing silica coupler and the hydrophobating agent are reactive with and, thus, compete for the silanol groups on the surface of the silica, it is important that the hydrophobating agent be added to the silica concurrent with or subsequent to the silica coupler. As a result, while the precise mechanism, or result, may not be completely known, it is considered herein that the hydrophobating agent exerts a synergistic benefit to the silica coupler, but does not replace its use.

The silica-reactive hydrophobating agent can be more particularly described as an alkylalkoxysilane of the general formula: $R_n$ $(R'O)_m$ Si where R and R' are individually selected from the group consisting of primary, secondary and tertiary alkyl radicals and alkaryl radicals having 1–30 carbon atoms; n and m are whole integers from 1–3 such that the sum of n and m is 4. Representative examples of primary alkyl radicals are those selected from at least one of methyl, ethyl, propyl, octyl, n-octadecyl, and n-hexadecyl. Representative examples of secondary alkyl radicals are those selected from at least one of isopropyl, sec-butyl. Representative examples of tertiary alkyl radicals are those selected from at least one of tert-butyl, dimethylbutyl.

It is the alkoxysilane moiety of the hydrophobating agent that is reactive with the surface of the precipitated silica which is usually the silanol groups on the surface of the silica.

Representative, although not intended to be limitative, of various hydrophobating agents are, for example, methyl triethoxysilane, propyl triethoxysilane, n-octyl triethoxysilane, n-hexadecyl triethoxysilane, dimethyl diethoxysilane, n-octadecyl trimethoxysilane, n-octadecyl triethoxysilane, and methyl n-octyl diethoxysilane.

In the practice of this invention, it has been observed that the addition of the aforesaid silica hydrophobating agent to the rubber silica composition, which contains the silica coupler, results in not only improved processing characteristics, such as reduced viscosity, but also improved cured performance of the vulcanized rubber composition which contains the silica, silane-containing silica coupler and silane-containing hydrophobating agent. Cured elastomer physical properties such as, for example, one or more of abrasion resistance, high modulus, rebound and low temperature hysteresis have been observed to be improved through use of the hydrophobating agent. This is considered herein to be beneficial because tire treads having such properties are anticipated herein to thereby provide one or more of improved treadwear, rolling resistance and traction.

Various hydrophobating agents have hereinbefore been used for various purposes in various elastomeric compositions such as, for example, silica reinforced rubber compositions as viscosity modifiers and processing aids.

It is considered herein that this invention is a departure from such prior practice. In this invention, a silica hydrophobating agent containing a silane moiety used in combination with a silica coupler, which also contains a silane moiety, in a substantially silica reinforced rubber composition is believed to be novel. Further, in practice, a unique synergistic performance has been observed which was not observed by use either the silica coupler or the hydrophobating agent by itself in a silica reinforced elastomer composition.

While various silica couplers can be used, a preferred coupler is a bis-(trialkoxysilylalkyl) polysulfide containing from 2 to about 8 sulfur atoms in the polysulfide bridge as hereinbefore mentioned. For example, the silica coupler can be bis-(3-triethoxysilylpropyl) tetrasulfide having an average of about 4 sulfur atoms in its polysulfide bridge or, in an alternative, a polysulfide having about 2 sulfur atoms in its polysulfide bridge.

Conventionally, a weight ratio of silica coupler to silica is in a range of about 0.01/1 to about 0.25/1.

In practice, a molar ratio based on silane functionality of silica hydrophobating agent to silica coupler is in a range of about 0.1/1 to about 2/1 alternatively, a molar ratio of about 0.3/1 to about 1/1, is preferred.

In one aspect of the invention, the rubber composition contains a combination of both silica and carbon black as elastomer reinforcing pigments with the reinforcing filler being predominately silica.

The rubber composition itself can also be provided as being a sulfur cured composition through vulcanization of the uncured elastomer composition. The sulfur curing is accomplished in a conventional manner, namely by curing under conditions of elevated temperature and pressure for a suitable period of time.

Further, and in accordance with this invention, a tire is provided having a tread of the rubber composition of this invention.

The said curatives for the process are curatives conventionally used for sulfur curable elastomers which typically include sulfur and one or more appropriate cure accelerators and sometimes also a retarder. Such curatives and use thereof for sulfur curable elastomer compositions are well known to those skilled in the art.

Further, sequential mixing processes for preparing sulfur curable rubber compositions in which elastomers and associated ingredients exclusive of curatives are first mixed in one or more sequential steps followed by a final mixing step for adding curatives are also well known to those skilled in the art.

In the practice of this invention, as hereinbefore pointed out, the rubber composition is comprised of at least one diene-based elastomer, or rubber. Such elastomers are typically selected from homopolymers and copolymers of conjugated dienes and copolymers of conjugated diene(s) and vinyl aromatic compound. Such dienes may, for example, be selected from isoprene and 1,3-butadiene and such vinyl aromatic compounds may be selected from styrene and alphamethylstyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), medium vinyl polybutadiene rubber (30–50 percent vinyl) and high vinyl polybutadiene rubber (50–90 percent vinyl).

In one aspect, particularly for a tire tread, the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and/or solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile terpolymer rubbers containing about 2 to about 40 weight percent bound acrylonitrile in the copolymer are also contemplated as diene based rubbers for use in this invention, particularly if used in combination with other diene-based elastomers.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR may be to promote a reduction in tire rolling resistance as a result of lower hysteresis when it is used in a tire tread composition.

The 3,4-polyisoprene rubber (3,4-PI) is considered beneficial for a purpose of promoting the tire's traction when it is used in a tire tread composition.

The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of promoting the tire tread's wear, or treadwear.

Such BR can be prepared, for example, by organic solution polymerization of 1,3-butadiene.

The BR may be conveniently characterized, for example, by having at least a 90% cis 1,4-content.

The cis 1,4-polyisoprene and cis 1,4-polyisoprene natural rubber are well known to those having skill in the rubber art.

The vulcanized rubber composition should contain a sufficient amount of reinforcing filler(s) namely, the precipitated silica, and carbon black if used, to contribute a reasonably high modulus and high resistance to tear for the cured rubber composition. The combined weight of the silica and carbon black, as hereinbefore referenced, may be as low as about 30 parts per 100 parts rubber, but is preferably from about 45 to about 90 parts by weight.

In practice, it is preferred that a major portion of the reinforcing filler is silica where both silica and carbon black are used as such filler.

The commonly employed siliceous pigments used in rubber compounding applications can be used as the silica in this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Zeosil 1165MP and silicas available from Degussa AG with, for example, designations VN2 and VN3, etc.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s), for this invention, if used, are hereinbefore set forth. It is to be appreciated that the silica coupler, and/or the silica hydrophobating agent, may be used in conjunction with a carbon black, namely, pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 3 phr.

Often stearic acid is used in a relatively impure state and is commonly referred to in the rubber compounding practice as "stearic acid" and is so referred to in the description and practice of this invention.

Typical amounts of zinc oxide comprise about 2 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of the prescribed hydrophobating agent in combination with a silica coupler in a silica reinforced rubber composition.

The presence and relative amounts of the other additives, as hereinbefore described, are not considered to be an aspect of the present invention which is more primarily directed to the utilization of the prescribed hydrophobating agent in combination with a silica coupler in a silica reinforced rubber composition.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, silica, silica coupler, silica hydrophobating agent, and carbon black if used, are mixed in one or more non-productive mix stages. The terms "non-productive" and "productive" mix stages are well known to those having skill in the rubber mixing art.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

In this Example, the silane-containing hydrophobating agent was evaluated as a component of compounding ingredients for a quantitatively silica reinforced elastomer composition.

Rubber compositions containing the materials set out in Table 1 were prepared in a Kobe™ internal mixer using two separate stages of addition (mixing), and one remill stage, namely, one non-productive mix stage, one remill mix stage, and a productive mix stage to temperatures of 160° C., 140° C. and 100° C. and times of 9 minutes, 1.3 minutes and 2 minutes, respectively. The amount of hydrophobating agent is listed as being "variable" in Table 1 and is more specifically set forth in Table 2.

The silane-containing coupling agent is used herein to obtain suitable cured properties in the silica containing rubber compound. Such properties include the 300% modulus, rebound, and particularly tangent delta at 0° C. and at 60° C.

In comparison with Sample 1, Sample 2, which was prepared with addition of 3 phr hydrophobating agent, clearly shows the processing advantages of lower mix work and lower compound viscosity, plus the cured property advantages in low and high temperature hysteresis and modulus. In particular, the tire tread performance indicator properties of Sample 2, which contains 3.0 phr hydrophobating agent, are better than those of Sample 1, namely, the 300% modulus is greater, indicative of improved reinforcement and treadwear potential, the tangent delta at 0° C. is higher indicative of improved traction potential, and the 100° C. rebound is higher as well as the tangent delta at 60° C. is lower, both indicative of improved (reduced) rolling resistance potential.

TABLE 1

| Non-Productive Mix Stages | |
|---|---|
| E-SBR[1] | 25 |
| IBR[2] | 45 |
| Cis 1,4-Polybutadiene[3] | 20 |
| NR[4] | 10 |
| Processing Oils, Waxes | 24.9 |
| Zinc Oxide | 2.5 |
| Fatty Acid | 3 |
| Antioxidants[5] | 3 |
| Silica[6] | 80 |
| Bis-(3-triethoxysilylpropyl) tetrasulfide[7] | 12.8 |
| N-Octadecyl Trimethoxysilane[8] | variable |

TABLE 1-continued

| Productive Mix Stage | |
|---|---|
| Sulfur | 1.4 |
| Accelerators, sulfenamide and guanidine types | 3.7 |

[1]Emulsion polymerization prepared styrene/butadiene copolymer rubber having a styrene content of about 40 percent obtained from The Goodyear Tire & Rubber Company;
[2]isoprene/butadiene copolymer rubber containing about 50 percent isoprene and having a Tg of about –43° C. obtained from the Goodyear Tire & Rubber Company;
[3]cis 1,4-polybutadiene rubber obtained as Budene 1254 from The Goodyear Tire & Rubber Company;
[4]natural cis 1,4-polyisoprene rubber;
[5]of the phenylene diamine types;
[6]silica obtainable as Z1165MP from Rhone Poulenc;
[7]a composite commercially available from Degussa GmbH as X50S in a form of a 50/50 blend of bis-(3-triethoxysilylpropyl) tetrasulfide (said tetrasulfide also available as Si69 from Degussa GmbH) with carbon black and, thus, the tetrasulfide is considered as being 50% of the composite. Technically, the tetrasulfide is understood to be an organosilane polysulfide as a composite, or mixture, in which the average polysulfide bridge contains about 3.5 to about 4 connecting sulfur atoms, although the mixture may contain such polysulfides with about 2 to about 8 connecting sulfur atoms;
[8]obtained as Si118 from Degussa GmbH.

TABLE 2

| Sample No. | 1 | 2 |
|---|---|---|
| N-Octadecyl Trimethoxysilane | 0 | 3 |
| Rheometer (150° C.) | | |
| Max. Torque, dNm | 40.00 | 41.20 |
| Min. Torque, dNm | 9.50 | 11.40 |
| Delta Torque | 30.50 | 29.80 |
| T$_{90}$, minutes | 9.00 | 9.20 |
| Stress-Strain | | |
| 300% Modulus, MPa | 10.81 | 10.91 |
| Hysteresis | | |
| Rebound (23° C.) | 35 | 39 |
| Rebound (100° C.) | 58 | 64 |
| Tan. Delta (60° C.) | .104 | .096 |
| Tan. Delta (0° C.) | .155 | .206 |
| Viscosity-Uncured | | |
| Mooney MS 1 + 1.5, 100° C. | 52 | 47 |
| Mixing Requirement | | |
| Mix Work, MJ/m³ | 2807 | 2518 |

In particular, this Example shows that the hydrophobating agent n-octadecyl trimethoxysilane, as utilized in Sample No. 2, in conjunction with the silica coupler, can provide significant improvements in the treadwear, traction, and rolling resistance indicator properties when compared to control Sample No 1 which contains only the silica coupler without the hydrophobating agent.

EXAMPLE II

The rubber compositions of Table 1 were prepared in a two-stage mixing procedure in a Kobe internal mixer using one non-productive mix stage and a productive mix stage to temperatures of 160° C. and 100° C., and times of 6 minutes and 2 minutes, respectively. Again, the amount of hydrophobating agent is listed as being variable in Table 1 and is given more specifically in Table 3.

In comparison to Sample No. 3, Sample No. 4 of Table 3, which was prepared with addition of 6 phr hydrophobating agent, clearly shows advantages in cured properties including higher rebound, lower abrasion loss as measured by DIN abrasion test, and higher tan. delta at 0° C., which are indicative of better tire tread performance in rolling resistance, treadwear, and traction, respectively.

TABLE 3

| Sample No. | 3 | 4 |
|---|---|---|
| N-Octadecyl Trimethoxysilane | 0 | 6 |
| Rebound (23° C.) | 37 | 41 |
| Rebound (100° C.) | 60 | 68 |
| DIN Abrasion, Rel. Wt Loss | 108 | 102 |
| Tan. Delta, 0° C. | .184 | .197 |

EXAMPLE III

Rubber compositions containing the materials set out in Table 4 and as described in Example I were prepared in a Kobe internal mixer using one non-productive mix stage and a productive mix stage, to temperatures of 160° C. and 100° C. and times of 8 minutes and 2 minutes, respectively. The amounts of both silica coupler and hydrophobating agent are listed as variable in Table 4 and are more specifically set forth in Table 5.

Sample No. 6 which contains only hydrophobating agent at 9.0 phr and no silica coupler, when compared to Sample No. 5 which contains only silica coupler at 6.4 phr and no hydrophobating agent, clearly shows much inferior reinforcing properties, including modulus, DIN abrasion resistance, and rebound.

Thus, the use of hydrophobating agent without silica coupler is observed to be inferior in all the physical property performance indicators. By contrast, the use of hydrophobating agent in combination with silica coupler provided synergistic improvements in all the physical property indicators (Examples I and II above).

TABLE 4

| Non-Productive Mix Stages | |
|---|---|
| S-SBR[1] | 70 |
| Cis-1,4-Polybutadiene rubber | 30 |
| Processing Oil, Waxes | 21.5 |
| Zinc Oxide | 2.5 |
| Fatty Acid | 3 |
| Antioxidants | 2 |
| Silica | 80 |
| Bis(3-triethoxysilylpropyl) tetrasulfide (50% active) | variable |
| N-Octadecyl Trimethoxysilane | variable |
| Productive Mix Stage | |
| Sulfur | 1.4 |
| Accelerators, sulfenamide and guanidine types | 3.7 |

[1]Organic solution polymerization prepared styrene/butadiene copolymer elastomer containing about 12 percent styrene and having a Tg of about –43° C., obtainable as Solflex 1216 from The Goodyear Tire & Rubber Company.

The remainder of the ingredients recited in Table 4 are similar or the same as those recited in Table 1.

The physical properties of the elastomer compositions recited in Table 4 are reported in the following Table 5 and reported herein as Sample No. 5 and Sample No. 6.

TABLE 5

| Sample No. | 5 | 6 |
|---|---|---|
| Bis(3-triethoxysilypropyl) tetrasulfide (50% active) | 12.80 | 0 |
| N-octadecyl trimethoxysilane | 0 | 9.00 |
| 300% Modulus, MPa | 10.61 | 2.44 |
| Rebound (23° C.) | 41 | 32 |
| DIN Abrasion, Rel. Wt Loss | 87 | 337 |

EXAMPLE IV

Rubber compositions containing the materials set out in Table 4 and as described in Example I were prepared with variable combinations of silica coupler and different hydrophobating agents. The amounts of these materials are specifically set forth in the following Table 6.

Samples 8, 9, 10 and 11 represent blends of silica coupler and hydrophobating agent, whereas Sample No. 7 contains only the silica coupler without the hydrophobating agent.

In Samples 8 and 9, one-half of the silica coupler is replaced by an equal weight of either of two hydrophobating agents, n-octadecyl trimethoxysilane or n-octyl triethoxysilane.

In Samples 10 and 11, one-fourth of the silica coupler is replaced by an equal weight of either of the two above hydrophobating agents.

The cured physical properties of Samples 8–11 are generally inferior to those of Sample No. 7 which uses the silica coupler in absence of the hydrophobating agent. Specifically, the abrasion loss is greater in all cases, and the 300% modulus is lower in all cases for Samples 8–11. Thus, despite the fact that the tan. delta at 0° C. and the 100° C. rebound values are similar for Samples 2–5 versus Sample No. 7, the overall tire tread performance of Samples 8–11 is considered to be inferior to that of Sample No. 7 as indicated by the aforesaid reduction in abrasion loss and reduction in the modulus.

The data in these Examples demonstrate that the use of hydrophobating agent in addition to silica coupler, as shown in previous Examples I and II, provided relatively unexpected synergistic improvements in many silica reinforced rubber compound properties indicative of better tire tread rolling resistance, traction and treadwear performance.

In contrast, the data from the previous Example III demonstrate that a use of a hydrophobating agent in place of silica coupler in a silica reinforced elastomer composition provided inferior results.

Likewise, the data in Example IV also demonstrate that partial substitution of the hydrophobating agent for a silica coupler in a silica reinforced elastomer composition was not desirable and gave inferior cured rubber compound properties.

TABLE 6

| Sample No. | 1 | 2 | 3 | 4 | 5 |
|---|---|---|---|---|---|
| Bis(3-triethoxysilyl-propyl) tetrasulfide | 6.4 | 3.2 | 3.2 | 4.8 | 4.8 |
| N-Octadecyl trimethoxysilane | 0 | 3.2 | 0 | 1.6 | 0 |
| N-Octyl triethoxysilane[1] | 0 | 0 | 3.2 | 0 | 1.6 |
| 300% Modulus, MPa | 10.6 | 6.1 | 7.1 | 8.6 | 8.7 |
| Rebound (100° C.) | 60 | 60 | 59 | 61 | 60 |
| DIN Abrasion, Relative Weight Loss | 87 | 124 | 104 | 93 | 92 |
| Tan. Delta 0° C. | .174 | .172 | .189 | .172 | .182 |

[1]Obtained as A137 from OSi Specialties, Inc.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition consisting essentially of (A) 100 parts by weight of elastomer consisting of at least one diene-based elastomer wherein the diene based elastomer is selected from at least one of cis 1,4-polyisoprene rubber, 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), medium vinyl polybutadiene rubber (30–50 percent vinyl), high vinyl polybutadiene rubber (50–90 percent vinyl) and emulsion polymerization prepared styrene/butadiene/acrylonitrile terpolymer rubber and butadiene/acrylonitrile copolymer rubber (B) about 30 to about 100 phr particulate reinforcing filler composed of silica and carbon black, composed of about 30 to about 100 phr of precipitated silica and correspondingly up to about 50 phr of carbon black, wherein the weight ratio of silica to carbon black is at least about 1/1, (C) at least one silica coupler having a moiety reactive with said silica and a moiety reactive with said elastomer(s) wherein the silica coupler is a bis-(trialkoxysilylorgano) polysulfide containing from about 2 to about 8 sulfur atoms in the polysulfide bridge, (D) about 0.5 to about 10 phr of silica-reactive, silane containing hydrophobating agent wherein the molar ratio based on silane functionality of hydrophobating agent to silica coupler is in a range of about 0.1/1 to 2/1; wherein said hydrophobating agent is selected from the group consisting of n-octyl triethoxysilane, n-hexadecyl triethoxysilane, n-octadecyl trimethoxysilane, n-octadecyl triethoxysilane, and methyl n-octyl diethoxysilane.

2. A rubber composition according to claim 1, consisted essentially of (A) 100 parts by weight of elastomer of claim 1, (B) about 45 to about 90 phr particulate reinforcing filler composed of silica and carbon black, composed of about 35 to about 85, phr of precipitated silica and correspondingly about 5 to about 40, phr of carbon black, wherein the weight ratio of silica to carbon black is at least about 1/1, (C) at least one said silica coupler having a moiety reactive with said silica and a moiety reactive with said elastomer(s), (D) about 0.5 to about 5, phr of silica-reactive, silane containing hydrophobating agent wherein the molar ratio based on silane functionality of hydrophobating agent to silica coupler is in a range of about 0.1/1 to 2.0/1; wherein said hydrophobating agent is selected from the group consisting of n-octyl triethoxysilane, n-hexadecyl triethoxysilane, n-octadecyl trimethoxysilane, n-octadecyl triethoxysilane, and methyl n-octyl diethoxysilane.

3. A tire having a tread of the composition of claim 1.
4. A tire having a tread of the composition of claim 2.
5. The rubber composition of claim 1 wherein the silica coupler is a bis-(trialkoxysilylalkyl) polysulfide.
6. The rubber composition of claim 1 wherein the silica coupler is a bis-(3-triethoxysilylpropyl) tetrasulfide.

7. A tire having a tread of the composition of claim 5.
8. A tire having a tread of the composition of claim 6.

* * * * *